June 19, 1934.      K. E. LYMAN ET AL      1,963,945
OIL FILTER MEDIUM AND METHOD OF MAKING THE SAME
Filed Jan. 2, 1931      2 Sheets-Sheet 1
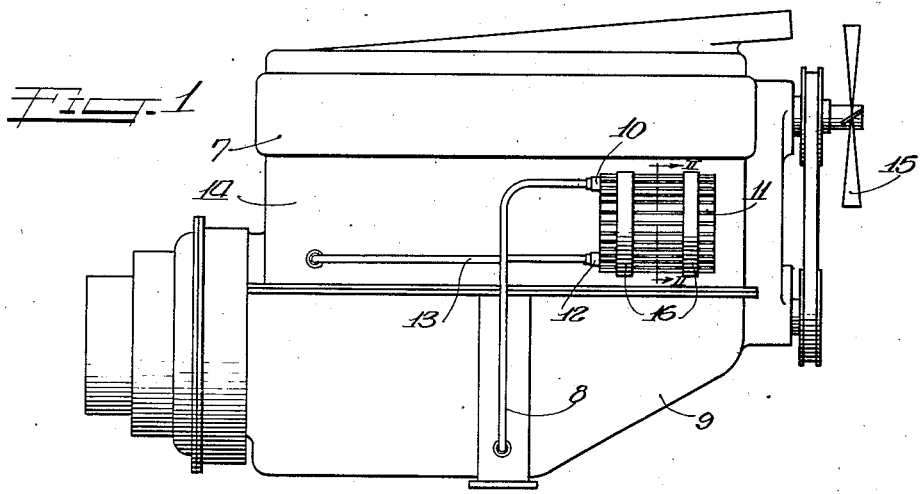
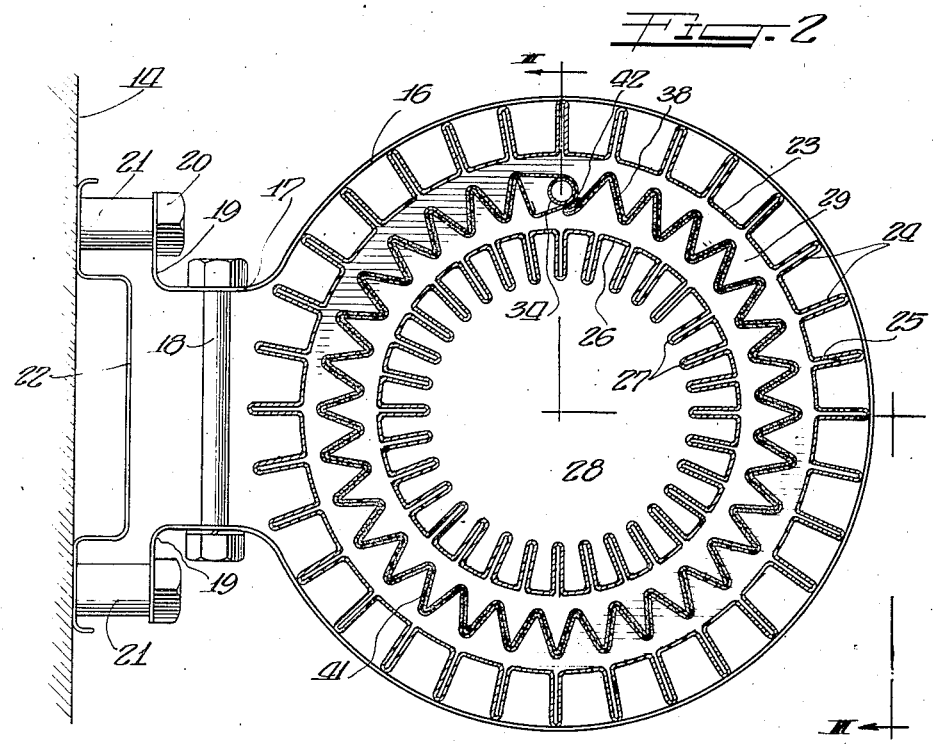
Inventors:
Kenneth E. Lyman.
Kay Miller.
by Charles _____ Attys.

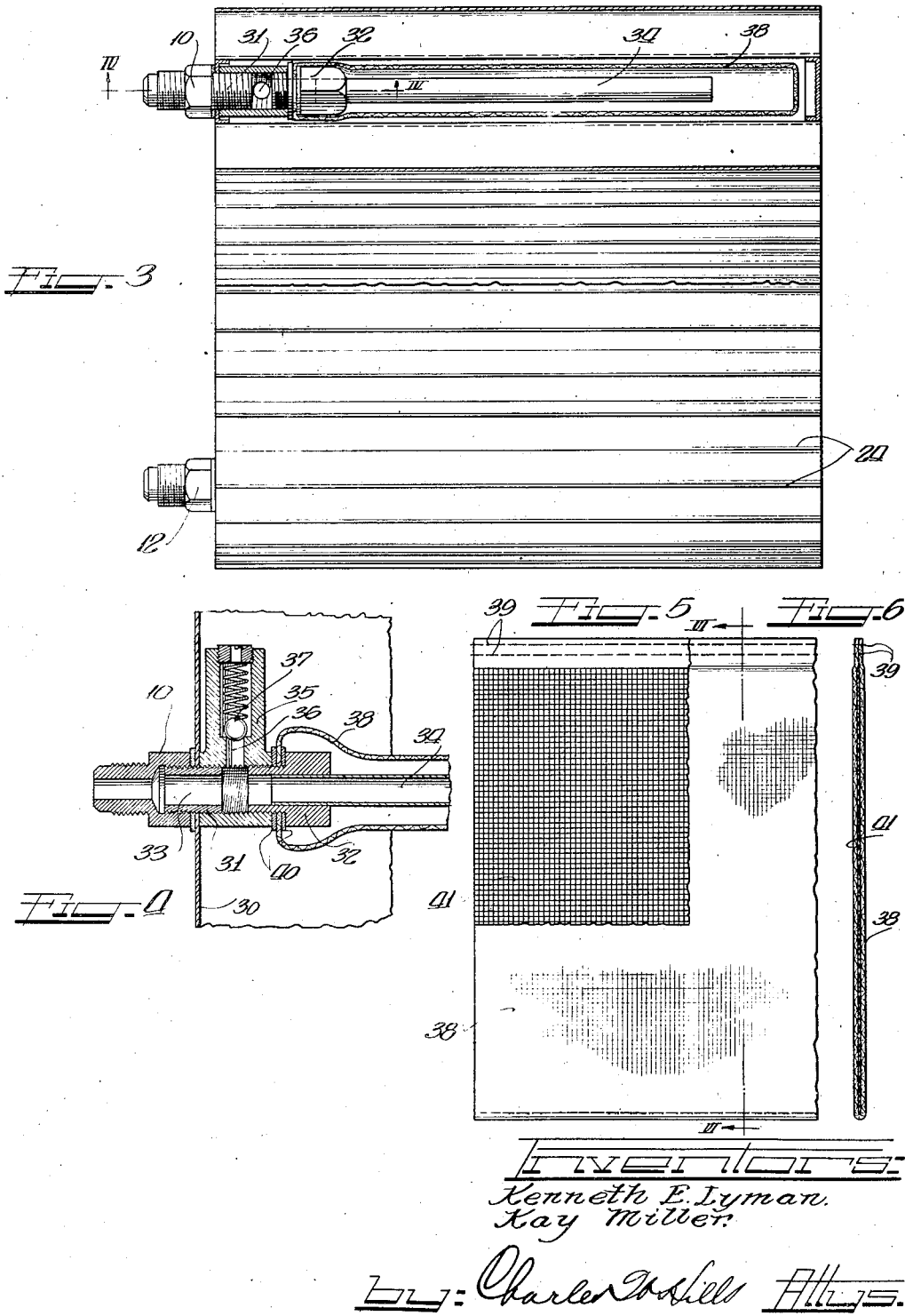

Patented June 19, 1934

1,963,945

UNITED STATES PATENT OFFICE 1,963,945

OIL FILTER MEDIUM AND METHOD OF MAKING THE SAME

Kenneth E. Lyman, Chicago, and Kay Miller, Rockford, Ill., assignors to Borg-Warner Corporation, Chicago, Ill., a corporation of Illinois Application January 2, 1931, Serial No. 506,185

2 Claims. (Cl. 210—169)

This invention relates to improvements in oil coolers and filters, especially a combined cooling and filtering unit, and more particularly to a filtering medium or member for incorporation in an oil cooling and filtering structure, although the invention may have many and various uses and purposes as will be apparent to one skilled in the art.

In the past many and various types of filtering mediums for lubricant have been developed, and difficulty has been experienced in placing a desired amount of filtering medium within a shell or casing. In some instances this has been accomplished by fluting the filter medium and using various structural components of the shell or other structures connected with the shell for maintaining the filter medium in a fluted condition, and in other instances, various other types of means have been employed for placing the greatest quantity of filtering medium within a rather restricted space. However, these formerly known filtering devices were objected to in that the filtering medium could not be as economically and expeditiously manufactured and assembled in a filter shell as is desirable.

With the foregoing in mind, and with various features more apparent hereinafter in mind, the present invention has for an object the provision of a filtering medium which is fluted prior to its insertion in a filter shell and maintained in fluted position by the inherent characteristics of the structure thereof.

It is also an object of this invention to provide an oil filter having a filtering medium therein which requires no aid from any mechanical parts or structures associated with the shell for maintaining its original shape.

A further object of this invention is the provision of a fluted filtering medium of sufficient fineness of texture to adequately filter oil and which requires no external means for maintaining the fluted shape of the medium.

Still another object of this invention is the provision of an oil filter having the inlet and outlet ports thereof at the same end but in effect admitting and passing out the oil at opposite ends thereof.

A further object of this invention is to provide an oil filter having a casing or shell provided with spaced fins or vanes within each of which the oil may pass for the purpose of cooling the same.

A still further object of the present invention is to provide a new and novel method of making a filtering medium.

While some of the more salient features, characteristics and advantages of a device embodying the present invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is an elevational view of an internal combustion engine equipped with an oil filtering device embodying principles of the present invention.

Figure 2 is an enlarged fragmentary vertical sectional view taken substantially as indicated by the line II—II of Figure 1.

Figure 3 is a transverse sectional view of the filtering device itself taken substantially as indicated by the staggered section line III—III of Figure 2.

Figure 4 is an enlarged fragmentary bottom plan sectional view taken substantially as indicated by the line IV—IV of Figure 3.

Figure 5 is a fragmentary view in elevation, with parts broken away, of the filtering unit employed in the present invention in an intermediate stage of its production.

Figure 6 is a vertical sectional view through the structure shown in Figure 5, taken substantially as indicated by the line VI—VI of Figure 5.

As shown on the drawings:

In the illustrated embodiment of the present invention, there is shown an internal combustion engine 7 of the type commonly used in automotive vehicles, equipped with a lubricating system including a conduit 8 leading from the crank case 9 to the intake connection 10 of an oil filter 11, and from the outlet connection 12 of the filter, a conduit 13 leads into the cylinder block 14 of the engine. While the device will function at great efficiency in any location, it is preferably mounted adjacent the forepart of the engine substantially in the line of the draft created by the engine fan 15, and in this instance, the unit is supported in this position by a pair of spaced bands or straps 16 each of which is suitably apertured in a substantially straight portion 17 thereof for the passage of a screw bolt 18 to provide a substantially resilient suspension, whereby the filter 11 is not injured by jars and vibrations of the engine or vehicle. The ends of the straps are outwardly turned as at 19 and each engages around the shank of a bolt 20, there being a collar 21 between the outwardly turned ends of the straps and a member 22 extending sufficiently in length for both bolts 20 associated with each strap to pass therethrough, the central portion of the member 22 being raised from the cylinder block. This entire mounting structure is, as stated above, shock absorbing and thusly protects the filter, and is also effective to insulate as well as space the filter from the engine block and heat contained therein.

The filter 11 may be of any desired character, but is preferably of the type more fully disclosed and described and claimed in my co-pending application for United States Letters Patent entitled "Oil cooler and filter", Serial No. 481,394, filed September 12, 1930. As pointed out more fully in the aforesaid application, the filter is in the form of a double walled cylinder, comprising an outer shell 23 provided with a plurality of spaced and preferably integral fins or vanes 24 extending substantially radially outward and longitudinally substantially the full length of the casing. In this instance, the fins 24 are so constructed as to leave a narrow channel 25 in the interior of each of them so that the oil may flow through the fins. The filter also includes an inner casing or shell 26 provided with fins 27 of substantially the same character as the fins 24 and extending substantially radially inwardly into an opening 28 directly through the central portion of the filter. The casings 23 and 24 are preferably concentric, and spaced apart to provide a cavity 29 therebetween for containing the oil and the filter medium which will be hereinafter described. As seen more clearly in Figure 4, a top and bottom of any desired character is provided for the filter to close the cavity 29 and the spaces 25 in the fins at the ends of the filter, the entire structure being preferably sealed with the exception of the inlet and outlet connections.

With reference now to Figures 3 and 4, it will be noted that the inlet connection 10 is threadedly engaged with the shank portion 31 of a coupling member 32, there being a suitable washer disposed between the connection 10 and the top 30 of the casing. The coupling member 32 is provided with a passage 33 therethrough in communication with the passage through the inlet connection 10, and from the lower or inside end of this passage a pipe 34 leads substantially to the bottom of the filter so that in effect the fluid enters the filter at the end thereof opposite to the exit. Also, threadedly engaged around the shank 31 of the coupling member 32 is a valve housing 35 having a passage 36 therein in communication with the passage 33, and equipped with the common ball and spring check valve 37.

The outlet connection 12 projects sufficiently through the end wall 30 into the cavity 29 to afford a suitable outlet for filtered and cooled oil.

The filter element itself, in this instance, comprises a bag 38, preferably of flannel or some equivalent filtering medium, which is stitched around the open edges thereof as indicated at 39 in Figures 5 and 6. With reference now to Figures 3 and 4, it will be seen that the inlet connections afford an effective seal with the filter bag. Disposed between the coupling connection 32 and the valve housing 35 is a pair of washers 40 of any suitable material between which the edges of the filter bag, around a suitable aperture therein, are compressed, the pipe 34 projecting downwardly within the bag so that the oil will be delivered inside of the bag and must pass therethrough before it can exit from the cavity 29 through the outlet connection 12 which communicates within the filter exteriorly of the bag. Within the bag 38 is a screen 41, which may be any desirable form of reticulated screen, preferably wire, and this screen is pressed to form the flutes or convolutions therein, the screen retaining the bag 38 in this position without the aid from any exterior structure, the bag being suspended loosely within the cavity 29 as seen more clearly in Figure 2.

In the present instance, a novel method of making the filter element itself is provided, this method being illustrated best in Figures 5 and 6. The medium of which the bag 38 is composed is first taken in a single flat sheet and folded over the screen 41 which is also initially flat, after which the bag is stitched along the open edges thereof, leaving a suitable aperture for the inlet connection, to effectively close the bag entirely around the screen. With the screen 41 securely sewed up in the bag, the unit in its flat condition is laid in any suitable pressing means and fluted after which it is folded in substantially a cylinder and inserted in the cavity 29 of the filter. As no need of securing the ends of the thusly-formed cylinder together, but if so desired, the ends of the bag may be secured at the point 42 (Figure 2) with any suitable adhesive, stitching, or equivalent means. With this method, the filter unit or medium may be very economically manufactured, and when once formed retains its fluted shape by means of the inherent characteristics therein and requires no aid whatsoever from any means associated directly with the filter casings. The ease of placing the bag properly into the filter is obvious, no particular care being required to retain the flutes in the bag or form the flutes in the bag.

The operation of the present invention is exceedingly simple, the oil leaves the crank case through the conduit 8 and enters the filter through the inlet connection passing down the pipe 34 to a point near the bottom or far end of the filtering element when the oil is discharged within the filter bag 38. The oil passes through the texture of the filter bag and is effectively cleaned of any impurities therein, after which the oil is free to move in the recesses 25 within the fins of the casing and the heat from the oil is readily dissipated by air passing over these fins. The oil then finds a ready exit through the outlet connection 12. The screen in the filter bag serves to distribute the oil more effectively throughout the area of the filter fabric by providing a better surface for the oil to flow along. In the event the filter element becomes plugged for any reason, or if the oil, for any reason, will not pass therethrough, a back pressure will be built up sufficient to open the check valve 37 and the oil will then be released directly into the filter in advance of the filtering medium so that the oil, even though impure, will be cooled and supplied to the engine at the desired rate.

From the foregoing, it will be apparent that I have provided an oil filter embodying a filter medium quite effective in results, and which is extremely easy and economical to manufacture and install. Furthermore, it will be apparent that the filter unit requires no exterior aid to maintain its shape and is not dependent upon the filter shell in any manner whatsoever for its disposition therein. It will also be appreciated that the filtering element may be constructed by a novel and expeditious method.

We are aware that many changes may be made and numerous details of construction may be varied through a wide range without departing from the principles of this invention, and we, therefore, do not purpose limiting the patent granted hereon otherwise than is necessitated by the prior art.

We claim as our invention:

1. An oil filter including a shell having a plurality of spaced fins projecting therefrom, each of said fins having an internal recess in communication with the interior of said shell, inlet and outlet connections extending into said shell adjacent the same end thereof, filter means in said shell, and a conduit leading from said inlet connection to substantially the other end of said shell on the opposite side of said filter means from said outlet connection.

2. As an article of manufacture, an oil filter including a double walled casing having a free central opening, filter means in said casing, inlet and outlet connections leading into said casing on opposite sides of said filtering means, and cooling fins extending inwardly from the inner wall into said central opening and outwardly from the outer wall of said casing, said fins being hollow and in communication with the interior of said casing.

KENNETH E. LYMAN.
KAY MILLER.